(12) United States Patent
Bornhorst et al.

(10) Patent No.: US 6,174,556 B1
(45) Date of Patent: Jan. 16, 2001

(54) DOUGH FORMING APPARATUS AND METHODS

(75) Inventors: William C Bornhorst, Plymouth; James M Olive, St. Paul; Niclas M Scher, Edina; Steven A Stein, Buffalo; Michael P Waldherr, Brooklyn Park; Lloyd J Zoubek, Minneapolis, all of MN (US)

(73) Assignee: General Mills, Inc., Minneapolis, MN (US)

( * ) Notice: Under 35 U.S.C. 154(b), the term of this patent shall be extended for 0 days.

(21) Appl. No.: 09/415,615

(22) Filed: Oct. 8, 1999

(51) Int. Cl.$^7$ .................................. A21C 5/00; A23P 1/00
(52) U.S. Cl. ..................... 426/503; 83/663; 425/237; 425/294; 426/496; 426/518
(58) Field of Search .................. 426/496, 502, 426/503, 518; 425/294, 237; 83/663, 664, 676

(56) References Cited

U.S. PATENT DOCUMENTS 3,279,398 * 10/1966 Weiss ................................. 426/503
3,310,006 * 3/1967 Hasten et al. ........................ 426/496
5,240,731 * 8/1993 Bornhorst et al. .................... 426/503

* cited by examiner

Primary Examiner—George C. Yeung
(74) Attorney, Agent, or Firm—Alan D. Kamrath; John A. O'Toole; Douglas J. Taylor

(57) ABSTRACT

An apparatus (10) for forming open ended, cone-shaped snack products includes a rotary cutter (28) having opposed, counterrotating rollers (30) each formed by multiple cutting discs (36) axially spaced on a mandrel (34) by spacers (38). A dough sheet formed by a sheet forming device (12) is conveyed to a slitting device (24) which slits the dough sheet into multiple pairs of dough strips. The dough strips are conveyed on a conveyer (26) towards the rotary cutter (28). The first dough strips of each pair pass over the end of the conveyor (26), and twisted 90° as they pass over sheaves (44, 56, 60) and pass between stationary guides (42) to the first roller (30) while the second dough strips of each pair pass over the end of the conveyor (26), are twisted 90° as they pass over sheaves (46, 58, 62) and pass between the stationary guides (42) to a second roller (30). The pair of dough strips are drawn under tension through the nip of the rollers (30) in a face to face stacked orientation. The snack products are cut and shaped by cavities (32) in the cutting discs (36).

35 Claims, 2 Drawing Sheets

DOUGH FORMING APPARATUS AND METHODS

BACKGROUND

The present invention generally relates to an apparatus and methods for forming food products, particularly, to an apparatus and methods for forming snack products intended to be held by the fingers and consumed in a single bite, and specifically to an apparatus and methods for forming three dimensional snack products having at least one open end, such as tapered or generally cone-shaped snack products.

One type of food product which has gained wide market acceptance is open-ended, three dimensional snack products. As an example, snack products sold under the trademark BUGLES have enjoyed considerable commercial success worldwide. The production of such snack products has been performed on apparatus of the type shown and described in U.S. Pat. No. 3,279,398 and especially of the type shown and described in U.S. Pat. 3,310,006, which patents are hereby incorporated herein by reference. In particular, the most recent production equipment prior to the present invention utilized fingers or die pins around which the individual snack products were formed. In this regard, a flat dough sheet was slit into dough strips and conveyed along a conveyor where the two outermost strips were passed through the spacing between adjacent conveyors and each twisted 90° and passed around rollers to the machine of U.S. Pat. No. 3,310,006, where the axis of the cutting wheels were parallel to the conveying direction of the dough strips on the conveyor. The remaining strips were continued to be conveyed where the next two outermost strips were passed through the spacing between adjacent conveyors to its corresponding machine, and this process was continued until the two center strips were passed over the end of a final conveyor to its corresponding machine. In certain manufacturing locations, the dough strips were untensioned when they entered the cutting wheels, while in some manufacturing locations the dough strips were under various degrees of tension depending upon the judgment of the particular tastes of the operator of the apparatus.

While such snack products have been successfully produced for over 35 years, there is a continuing need for improved apparatus and methods of production to reduce production costs and to enhance product uniformity. In particular, the machine of U.S. Pat. No. 3,310,006 is formed from many moving parts which are subject to wear, failure, and other operational problems. Thus, the prior production machine was capital intensive and operationally expensive in both parts and labor. But more importantly, a major factor in production costs is the area of the footprint of the apparatus in the production facilities, with production expenses being directly related to the amount of space that is required for the production of the snack products. It can be appreciated that because the mechanism for carrying the fingers or die pins must be arranged perpendicularly to the nip between the cutting wheels, it is not possible to arrange the mechanisms to allow the apparatus to be of a compact size but requires considerable spacing between each of the mechanisms.

Accordingly, it is an object of the present invention to provide novel apparatus and methods for forming three dimensional snack products from continuous dough strips.

It is further an object of the present invention to provide such novel apparatus and methods for forming three dimensional snack products including at least one open end.

It is further an object of the present invention to provide such novel apparatus and methods having reduced production costs and enhanced product uniformity than produced utilizing prior apparatus and methods.

It is further an object of the present invention to provide such novel apparatus and methods including rotary cutters formed by multiple axially spaced cutting discs on the same mandrel.

It is further an object of the present invention to provide such novel apparatus and methods including enhanced removal of the individual food products from the cavities of the cutting discs.

It is further an object of the present invention to provide such novel apparatus and methods enhancing the separation of the dough strips during further processing such as during deep frying without requiring the use of fingers or die pins during formation.

It is further an object of the present invention to provide such novel apparatus and methods minimizing the area of the footprint of the apparatus.

SUMMARY

Surprisingly, the above objectives can be satisfied in the field of the production of individual food products by providing, in the preferred form, a rotary cutter in the preferred form of an opposed pair of counterrotating rollers abutting together along a nip and with at least one of the rollers including multiple, axially spaced cutting discs having cavities which cut and shape dough strips into individual food products.

In preferred aspects of the present invention, a pair of dough strips are passed through the nip of the rollers in a face-to-face stacked orientation, and in most preferred aspects are under tension so that the individual food products are prestressed to enhance separation of the dough strips (especially open ends thereof) during deep frying or other finishing processes of the individual food products.

In still other aspects of the present invention, the dough strips are formed by slitting a dough sheet into multiple pairs of dough strips, and in most preferred aspects, the dough sheet is formed with one face including a three dimensional configuration, with the pair of dough strips passing through the rotary cutter with their three dimensional faces outward.

In still further aspects of the present invention, the individual food products are removed from the cavities by directing flowing air from passageways formed in stationary guides into the cavities downstream of the nip and/or by drawing the individual food products from the cavities by a vacuum.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
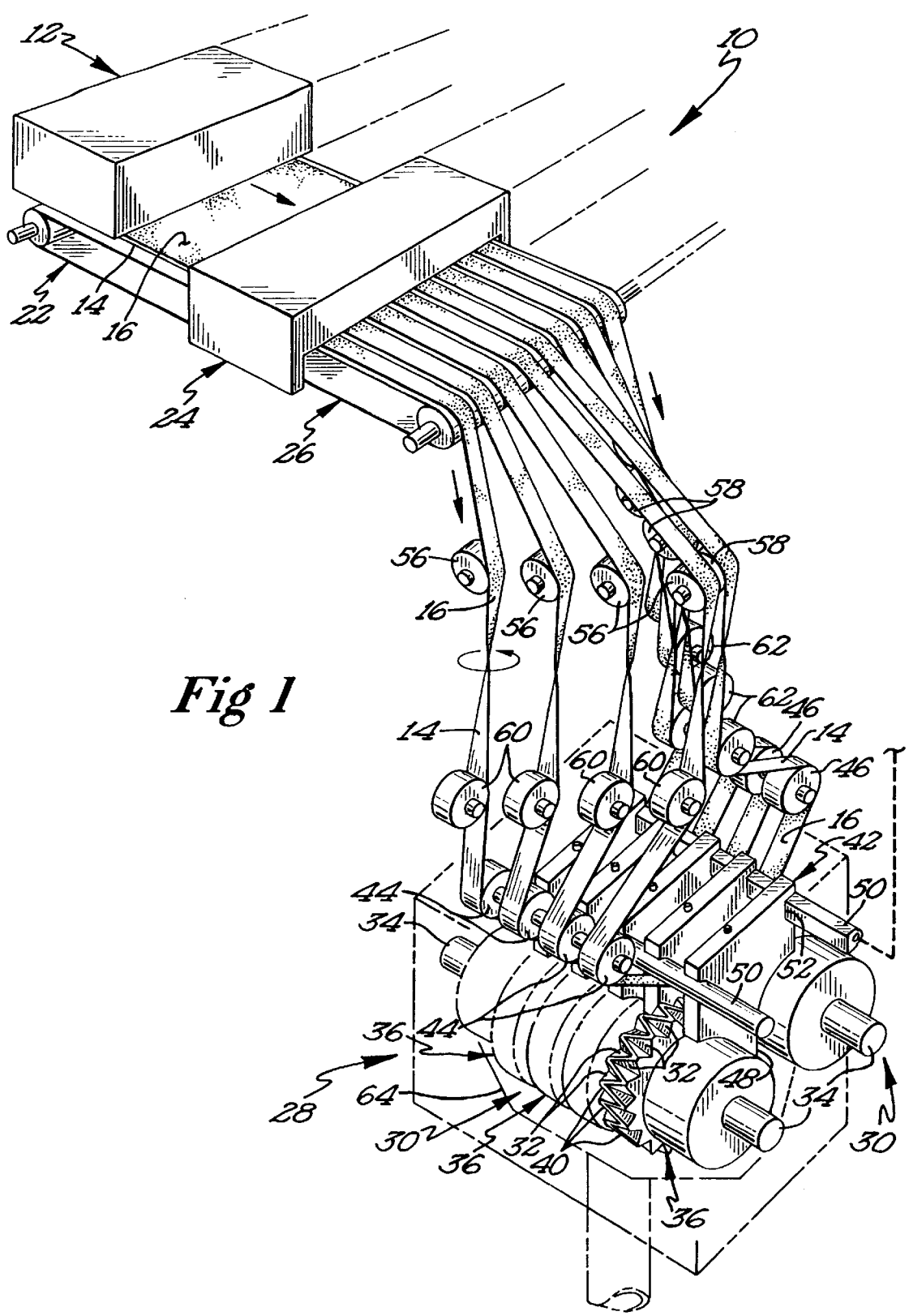
FIG. 1 shows a perspective, partially diagrammatic, view of an apparatus for forming open-ended three dimensional snack products according to the methods of the preferred teachings of the present invention.
Figure 2:
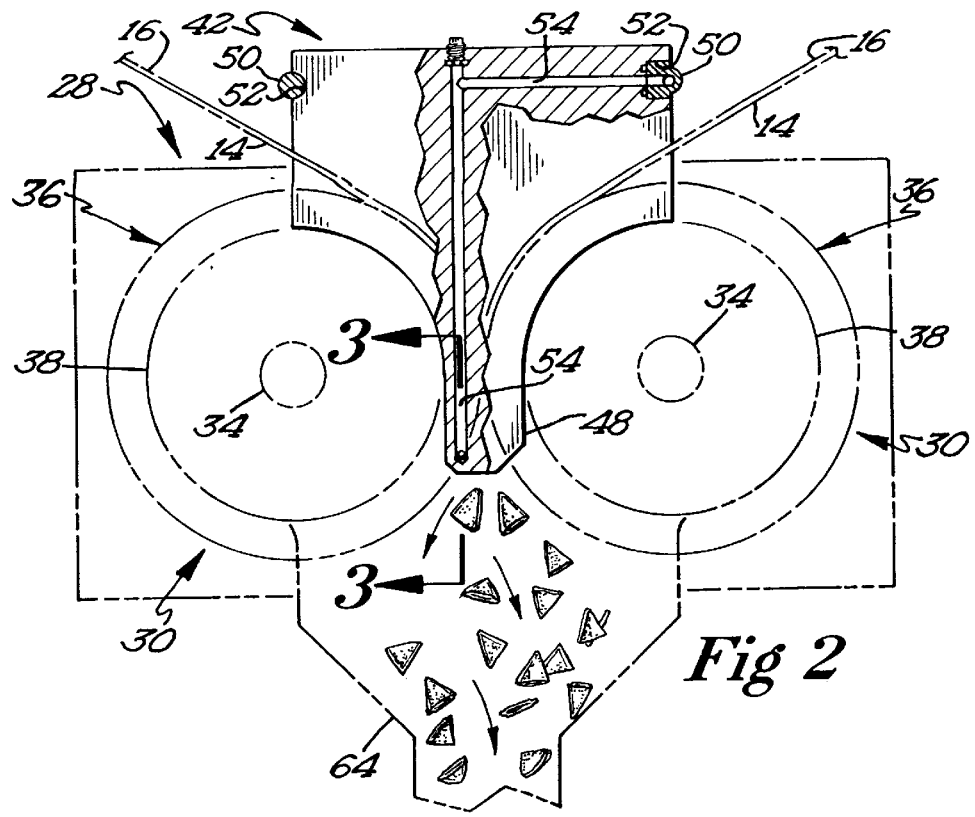
FIG. 2 shows an end view of the apparatus of FIG. 1, with portions shown in phantom and portions shown broken away.
Figure 3:
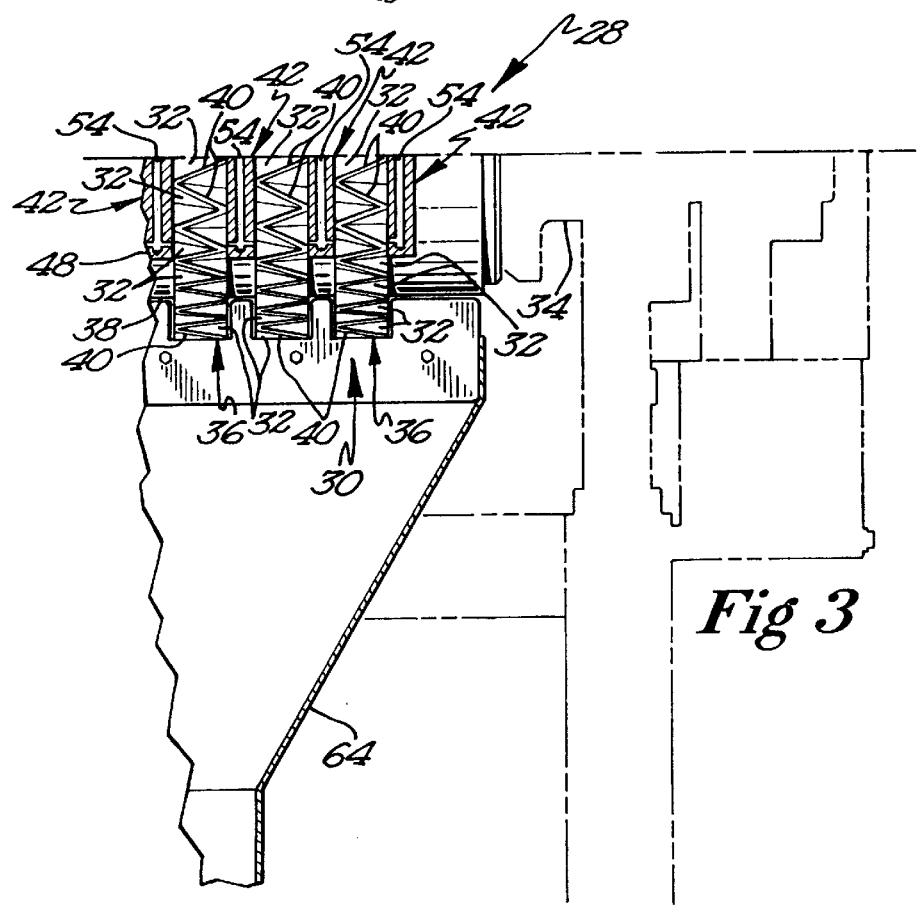
FIG. 3 shows a partial, cross sectional view of the apparatus of FIG. 1 according to section line 3—3 of FIG. 2.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first," "second," "end," "side," "horizontal," "vertical," "upstream," "downstream," "axial," "width," "edge,"=0 "outward,"=0 "outer," and similar terms are used herein, it should be understood that these terms have reference only to the structure shown in the drawings as it would appear to a person viewing the drawings and are utilized only to facilitate describing the illustrative embodiment.

DESCRIPTION

Apparatus for forming open-ended three dimensional snack products according to the methods of the preferred teachings of the present invention is shown in the drawings and generally designated 10. Generally, apparatus 10 includes a sheet forming device 12 into which dough is formed into a dough sheet formed of a cooked farinaceous dough and having first and second faces 14 and 16 and opposed free edges. In the preferred form, first face 14 includes a three dimensional configuration and in the most preferred form is corrugated, while the second face 16 is smooth.

In the most preferred form shown, the dough sheet exiting the sheet forming device 12 is conveyed generally horizontally or at an upward incline on a conveyor 22 to a slitting device 24 which slits the dough sheet into multiple pairs of dough strips. Slitting device 24 can be of any conventional design including but not limited to a purchased component. Each of the strips in each pair are of an identical width and in the most preferred form all of the dough strips have identical width. In the most preferred form, the combined width of all of the dough strips have a width equal to the width of the dough sheet entering slitting device 24. In the most preferred form, slitting device 24 slits the dough sheet into seven pairs of dough strips or in other words fourteen dough strips of equal width.

In the most preferred form, the dough strips exiting slitting device 24 are conveyed generally horizontally on a conveyor 26 with their edges abutting generally in the same position as when the dough strips are slit from the dough sheet, with the strips being shown in FIG. 1 as being slightly separated for ease of illustration. The dough strips are conveyed by conveyor 26 to a piece forming device or rotary cutter 28. Rotary cutter 28 is constructed having opposed pair of counterrotating rollers 30 which abut together along a nip, with at least one of the rollers 30 having cavities or depressions 32 which stamp out the desired shape and size pieces from the dough strips. In the most preferred form, both rollers 30 have cavities 32. Specifically, in the most preferred form, each roller 30 includes a mandrel 34 upon which multiple, axially spaced cutting discs or plates 36 and spacers 38 are axially positioned, with the number of cutting discs 36 being at least equal to the number of pairs of dough strips leaving slitting device 24. Cutting discs 36 have an axial width generally equal to and in the preferred form slightly larger than the width of the corresponding pair of dough strips. Spacers 38 can have any desired axial width including but not limited to of an axial width less than each cutting disc 36 so as to minimize the axial extent of rollers 30.

According to the preferred teachings of the present invention to form open ended pieces, each cavity 32 is formed by at least first and second blades 40 which terminate at spaced points on at least one axial side of cutting disc 36. In the most preferred form shown, blades 40 at the periphery of roller 30 are generally in the shape of an isosceles triangle and intersect at one of the axial sides of cutting disc 36 and are spaced at the other axial side, with the axial direction of the isosceles triangle alternating around the periphery of cutting disc 36. The cavity 32 between blades 40 can be of any desired shape such as half of a cone, half of a pyramid, or the like.

It should be appreciated that cavities 32 can have a variety of shapes and sizes. Specifically, cavities 32 could have shapes where blades 40 terminate at spaced points on both axial sides of cutting discs 36, first and second cavities 32 could be formed axially positioned side by side in cutting discs 36, cavities 32 could be shaped by blades 40 which are not linear at the periphery of roller 30, and the like. Likewise, different shaped cavities 32 could be formed on the same cutting disc 36 and/or the shape of cavities 32 in one or more discs 36 could be different from the shapes of cavities 32 of other discs 36 in roller 30. Likewise, the size and shape of cavities 32 are dependent on the axial width of the particular cutting disc 36 which is equal to the width of the corresponding dough strips. Furthermore, the preferred construction of rollers 30 allows cutting discs 36 to be removed and replaced on mandrel 34 due to wear or according to the particular shapes of cavities 32 to produce the desired snack product.

In the event that both rollers 30 include cavities 32 as in the most preferred form, rollers 30 are driven such that blades 40 abut with each other during the rotation of rollers 30. Rotary cutter 28 further includes a multiplicity of stationary guides 42 positioned on opposite axial sides of each cutting disc 36. In the most preferred form, the number of guides 42 is one greater than the number of cutting discs 36, with the guides 42 positioned axially between cutting discs 36 being of an axial width generally equal to the axial width of the corresponding spacer 38. In the most preferred form, each guide 42 includes a linear top and linear front and back edges extending generally perpendicular from the top, with the bottom including a pair of arcuate cutouts of a size corresponding to and for abutting with spacers 38 of the pair of rollers 30. Additionally, as spacers 38 have a radial extent less than discs 36, the bottom of each guide 42 includes a projection 48 extending between the arcuate cutouts beyond the nip of discs 36. In the most preferred form, guides 42 are held in position relative to rollers 30 by first and second rods 50 extending at a spaced, parallel arrangement to each other and the axes of rollers 30, with rods 50 being received in notches 52 formed in the front and back edges of guides 42. In the most preferred form, an air passage 54 extends from adjacent to but spaced from the lower end of projection 48 to one of the notches 52 and in fluid communication with rod 50 received therein and in the form of an air conduit. Passage 54 includes a bore intersecting with both faces of guides 42 for guides 42 located intermediate discs 36 and on the face abutting with disc 36 in the case of the axially outer or end guides 42. The bores of passage 54 are located downstream of the nip of rollers 36 and at a position to provide air flow into cavities 32 of at least one of rollers 30 downstream of the nip of rollers 30. Suitable valving can be provided to allow adjustment of air flow preferably at each individual guide 42.

Apparatus 10 according to the teachings of the present invention includes first and second series of rollers or sheaves 44 and 46 for directing each of the dough strips in each pair of dough strips to the corresponding cutting disc 36. In the preferred form, the common axis of rollers 44 and the common axis of rollers 46 are parallel to but located on opposite horizontal sides of the nip of rollers 30 of rotary cutter 28 and in the most preferred form are located vertically between the end of conveyor 26 and the nip of rotary cutter 28. In the most preferred form, the end of conveyor 26 is generally spaced vertically above and perpendicular to the nip of rollers 30 and to the axes of rollers 30, 44 and 46.

In the most preferred form, third and fourth series of rollers or sheaves 56 and 58 for directing each of the dough strips are provided vertically intermediate the end of conveyor 26 and sheaves 44 and 46. The axes of sheaves 56 and 58 are generally parallel to the end of conveyor 26 and perpendicular to the nip of rollers 30 and to the axes of rollers 30, 44 and 46. Sheaves 56 and 58 are arranged in a V-configuration. Specifically, sheaves 56 and 58 of the center pair of dough strips are located along a common axis, sheaves 56 and 58 of the next pair of dough strips located on opposite axial sides of the center pair of dough strips are located along a common axis but spaced from the common axis of sheaves 56 and 58 of the center pair of dough strips, sheaves 56 and 58 of the next pair of dough strips located on opposite axial sides of the prior and center pair of dough strips are located along a common axis but spaced from the common axis of sheaves 56 and 58 of the prior pair of dough strips and in the same direction as the common axis of sheaves 56 and 58 of the previous pair of dough strips, and so on.

In the most preferred form, fifth and sixth series of rollers 60 and 62 for directing each of the dough strips are provided vertically intermediate first and second sheaves 44 and 46 and third and fourth sheaves 56 and 58. The axes of sheaves 60 and 62 are generally perpendicular to the end of the conveyor 26 and the axes of sheaves 56 and 58 and parallel to the nip of rollers 30 and to the axes of rollers 30, 44, and 46. Sheaves 60 and 62 are arranged in a V-configuration. Specifically, sheaves 60 and 62 of the center pair of dough strips are located along spaced, parallel axes, sheaves 60 and 62 of the next pair of dough strips located on opposite axial sides of the center pair of dough strips are located along parallel axes parallel to the axes of the center pair of sheaves 60 and 62 but at a greater spacing, sheaves 60 and 62 of the next pair of dough strips located on opposite axial sides of the prior and center pair of dough strips are located along parallel axes parallel to the axes of the center pair and prior pair of sheaves 60 and 62 at a greater spacing than the prior pair of sheaves 60 and 62, and so on.

Now that the basic construction of apparatus 10 according to the preferred teachings of the present invention has been set forth, a method for forming open ended three dimensional snack products according to the teachings of the present invention can be explained. Specifically, dough is formed into a dough sheet such as by sheet forming device 12 and in the most preferred form, with face 14 being textured while face 16 is smooth. After being conveyed by conveyor 22 with face 14 abutting with the conveyor 22, the dough sheet is slit into multiple pairs of dough strips such as by slitting device 24, with the edges of the dough strips being in an abutting relation. The dough strips are conveyed in a conveying direction on conveyor 26 towards the rotary cutter 28, with the faces 14 of the dough strips abutting with the conveyor 26. From the end of conveyor 26, each pair of dough strips extends such that faces 16 engage with and passes over the corresponding sheaves 56 and 58 to direct and deflect the path of the first dough strips from a common plane at the end of conveyor 26 into a V-configuration, with each pair being in the same plane but with the planes of the pairs of dough strips being in a spaced parallel relation. From sheaves 56 and 58, the dough strips extend such that faces 16 engage with and pass over the corresponding sheaves 60 and 62 and are thereby each twisted 90° such that faces 16 of the dough strips are parallel to and facing each other and in a V-configuration. From sheaves 60 and 62, the dough strips extend such that faces 16 engage with and pass over the corresponding sheaves 44 and 46.

From sheaves 44 and 46, each pair of dough strips extends between the corresponding guides 42 such that faces 14 engage with the periphery of the corresponding cutting disc 36 spaced from the nip between rollers 30 in a direction opposite to the rotation direction of rollers 30. The rotation of rollers 30 draws each of the dough strips between the peripheries of the corresponding cutting discs 36 to pass each pair of dough strips in a face to face stacked orientation and in the most preferred form with faces 16 of the dough strips engaging each other. The sandwiched dough strips are thereby cut by blades 40 and formed into individual snack products in the shape of cavities 32 as the dough strips pass between the nip of rollers 30. It can then be appreciated that in the individual snack products, the dough strips will generally be secured together along the edges where blades 40 cut through and have faces 16 generally abutting together but not secured at other locations.

After passing between the nip of rollers 30, cavities 32 of the corresponding cutting discs 36 separate as rollers 30 rotate and thereby allow the individual snack products to fall from cavities 32 under gravitational forces. However, to overcome any tendencies of the individual snack products to remain in cavities 32 such as the result of the stickiness of the dough, pressurized air flowing from passage 54 will tend to dislodge any individual snack products which do not dislodge by themselves as cavities 32 separate. In this regard, locating passages 54 in guides 42 allows the air to be directed generally perpendicularly or at a nonparallel angle to the axial sides of cutting discs 36 which is better at product removal than air directed generally parallel to the axial sides of cutting discs 36. Additionally, removal of products can be accomplished close to the nip of rollers 30 utilizing passages 54 in guides 42 according to the preferred teachings of the present invention which enhances the ability of the product to open. Additionally, in the most preferred form, the individual snack products are conveyed from cutter 28 by a vacuum conveying system including a transition 64 in an operationally sealed arrangement with the downstream side of cutter 28. Thus, the individual snack products are drawn from cavities 32 by a vacuum of the vacuum conveying system. The use of flowing air and/or vacuum according to the teachings of the present invention is clearly advantageous over the use of scrapers or brushes which result in product damage. However, scrapers or brushes and/or a back-up air knife can be utilized to prevent product from passing all the way around discs 36 and could be positioned outside of transition 64.

Thereafter, the individual snack products are dried and then further processed such as by deep frying to form the end product. When further processed, the portions of dough strips which are not secured together will have a tendency to separate from each other. In the preferred form, where the dough strips are cut prior to being positioned together and as blades 40 are spaced at least on one of the axial sides of cutting discs 36, the corresponding end of the individual snack product will not be axially secured at that axial side and will tend to open during further processing. It has been found that this tendency can be enhanced by placing the dough strips under tension when the individual snack products are being cut and shaped when passing through the nip of cutting discs 36 of rollers 30. Specifically, in the most preferred form, the movement speed of rollers 30 at their nip is slightly greater than the speed of conveyor 26 to thereby cause the dough strips to be under tension between conveyor 26 and sheaves 44 and 46 and the nip of rollers 30 when cut and shaped, with the dough strips being secured together along their edges which were cut by blades 40 while under tension and thus being prestressed before drying and further processing. During further processing, this prestressing enhances the separation of the dough strips where they are not secured together and thereby the opening of the ends in cone-shaped snack products.

It should be appreciated that due to the customer recognition of snack products formed by the machine of U.S. Pat. No. 3,310,006 as the result of their commercialization over an extended period of time, it is desirable that product produced with the methods of the present invention have similar size and weight characteristics as those which have previously enjoyed considerable commercial success. In this regard, it was observed that the amount of dough present and the size of the opened snack products were less utilizing the methods of the present invention than utilizing the machine of U.S. Pat. No. 3,310,006 if the same cavities 32 were utilized. In this regard, for cone-shaped snack products, it was necessary to increase the intersecting angle of blades 40 to 45° to obtain the same size product as product formed in a cavity having an intersecting angle of 36.9° but which was formed around a finger or die pin and to slightly decrease the axial width of the dough strips by 8⅓ percent. However, it should be appreciated that it is believed that commercially successful product could be produced with the same cutting discs as previously utilized, but such products would not have the same product characteristics as previously produced on those cutting discs utilizing fingers or die pins, which was not desired in the most preferred form of the present invention.

It should also be appreciated that apparatus 10 according to the preferred teachings of the present invention is advantageous for several reasons. First, due to rotary cutter 28 including multiple cutting discs 36 axially spaced on the same mandrel 34, apparatus 10 is of a very compact size having a footprint of minimal size according to the preferred teachings of the present invention. Additionally, opening of the snack products is accomplished without the use of fingers or die pins or without requiring the shaping of the dough strips before their introduction into rotary cutter 28. Thus, the complexity and number of moving parts which are subject to wear, failure, and other operational problems and the amount of operator involvement are minimized in apparatus 10 according to the teachings of the present invention.

Now that the basic teachings of the present invention have been explained, many extensions and variations will be obvious to one having ordinary skill in the art. For example, although the preferred embodiment of the present invention has been explained with devices 12, 24 and 28 being in a horizontally spaced arrangement, devices 12, 24 and 28 of apparatus 10 according to the teachings of the present invention can have other arrangements including but not limited to vertical.

Similarly, the orientation and arrangement of cutter 28 relative to conveyor 26 and the number and arrangement of sheaves 44, 46, 56, 58, 60 and 62 can be varied according to the teachings of the present invention. As an example, in pilot programs commercially acceptable products were produced with the end of conveyor 26 being vertically spaced above but parallel to the nip of rollers 30 with only first and second series of sheaves 44 and 46 being provided with the dough strips in each pair being physically adjacent each other immediately after slitting and with the first of end pair of dough strips not being twisted and the second of each pair of dough strips being twisted 180°.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for forming individual food products comprising: forming a dough sheet having first and second faces; slitting the dough sheet into multiple pairs of dough strips; counterrotating an opposed pair of rollers which abut together along a nip and with at least one of the rollers including multiple, axially spaced cutting discs having cavities; and passing each pair of dough strips in a face to face stacked orientation through the nip of a corresponding cutting disc of the opposed pair of rollers with the cavities cutting and shaping the dough strips into the individual food products.

2. The method of claim 1 wherein passing each pair of dough strips comprises passing each pair of dough strips in the stacked orientation with the second faces abutting.

3. The method of claim 2 wherein the first face includes a three dimensional configuration and the second face is smooth.

4. The method of claim 2 wherein passing each pair of dough strips includes passing the second face of a first of each of the pairs of dough strips over a first sheave, with the first sheaves of the multiple pairs of dough strips being rotatable along a first axis; and passing the second face of a second of each of the pairs of dough strips over a second sheave, with the second sheaves of the multiple pairs of dough strips being rotatable about a second axis parallel to and spaced from the first axis.

5. The method of claim 4 wherein passing each pair of dough strips includes tensioning the dough strips passing through the nip of the corresponding cutting disc of the opposed pair of rollers.

6. The method of claim 5 further comprising guiding each pair of dough strips to the corresponding cutting disc by stationary guides on opposite axial sides of each of the cutting discs.

7. The method of claim 6 wherein counterrotating the opposed pair of rollers includes the cavities defined by blades terminating at spaced points on at least one axial side of the cutting disc such that the individual food products are not secured at the axial side of the cutting disc when cut and shaped by the cavities.

8. The method of claim 7 wherein passing each pair of dough strips includes conveying the slit dough sheet generally horizontally to an end, with the end located vertically above the nip of the rollers, with the first and second axes of the first and second sheaves located vertically between the end and the nip of the rollers.

9. The method of claim 6 further comprising directing flowing air from passageways in the stationary guides into the cavities downstream of the nips of the cutting discs.

10. The method of claim 9 further comprising drawing the individual food products by a vacuum from the cavities downstream of the nips of the cutting discs.

11. The method of claim 1 further comprising directing flowing air from passageways into the cavities downstream of the nips of the cutting discs.

12. The method of claim 1 further comprising drawing the individual food products by a vacuum from the cavities downstream of the nips of the cutting discs.

13. The method of claim 1 wherein passing each pair of dough strips includes passing the second face of a first of each of the pairs of dough strips over a first sheave, with the first sheaves of the multiple pairs of dough strips being rotatable along a first axis; and passing the second face of a second of each of the pair of dough strips over a second sheave, with the second sheaves of the multiple pairs of dough strips being rotatable about a second axis parallel to and spaced from the first axis.

14. The method of claim 13 wherein passing each pair of dough strips includes passing the second faces of the first of each of the pairs of dough strips over a third sheave; passing the second faces of the second of each of the pairs of dough strips over a fourth sheave, with the axes of the third and fourth sheaves being parallel, with the axes of the third and fourth sheaves being in a V-configuration; passing the second faces of the first of each of the pairs of dough strips over a fifth sheave; and passing the second faces of the second of each of the pairs of dough strips over a sixth sheave, with the axes of the fifth and sixth sheaves being parallel to each other and to the axes of the first and second sheaves but perpendicular to the axes of the third and fourth sheaves, with the fifth and sixth sheaves being in a V-configuration.

15. The method of claim 1 further comprising guiding each pair of dough strips to the corresponding cutting disc by stationary guides on opposite axial sides of each of the cutting discs.

16. The method of claim 1 wherein counterrotating the opposed pair of rollers includes the cavities defined by blades terminating at spaced points on at least one axial side of the cutting disc such that the individual food products are not secured at the axial side of the cutting disc when cut and shaped by the cavities.

17. The method of claim 1 wherein passing each pair of dough strips includes tensioning the dough strips passing through the nip of the corresponding cutting disc of the opposed pair of rollers.

18. Apparatus for forming individual food products from dough strips comprising: a rotary cutter including an opposed pair of counterrotating rollers which abut together along a nip, with at least one of the rollers including multiple, axially spaced cutting discs having cavities which cut and shape the dough strips into the individual food products.

19. The apparatus of claim 18 further comprising, in combination: means for directing multiple first dough strips to engage one of the pair of counterrotating rollers spaced from the nip; and means for directing multiple second dough strips to engage the other of the pair of counterrotating rollers spaced from the nip, with the first and second dough strips being drawn through the nip in a face to face stacked orientation.

20. The apparatus of claim 19 wherein the dough strips are tensioned between the directing means and the nip of the rollers.

21. The apparatus of claim 19 further comprising, in combination: means for slitting a dough sheet having first and second faces into multiple pairs of first and second dough strips.

22. The apparatus of claim 21 wherein the means for directing the multiple dough strips directs the second faces of the first and second dough strips to abut in the stacked orientation.

23. The apparatus of claim 22 further comprising, in combination: stationary guides on opposite axial sides of each of the cutting discs for guiding the dough strips to the nip of the rollers.

24. The apparatus of claim 22 further comprising, in combination: a sheet forming device for forming dough into the dough sheet having a first face including a three dimensional configuration.

25. The apparatus of claim 23 wherein the stationary guides extend downstream of the nip of the counterrotating rollers and include passages for directing flowing air into the cavities downstream of the nip of the counterrotating rollers.

26. The apparatus of claim 25 further comprising, in combination: a transition in an operationally downstream sealed arrangement with the rotary cutter for drawing the individual food products from the cavities by a vacuum.

27. The apparatus of claim 21 further comprising, in combination: a conveyor for conveying the slit dough sheet generally horizontally to an end of the conveyor, with the end of the conveyor located vertically above the nip, with the directing means located vertically between the conveyor and the rotary cutter.

28. The apparatus of claim 19 wherein the directing means comprises, in combination: a series of first sheaves rotatable about a common first axis, with the first sheaves individually directing the multiple first dough strips; a series of second sheaves rotatable about a common second axis parallel to and spaced from the first axis, with the second sheaves individually directing the multiple second dough strips; a series of third sheaves each individually rotatable about a third axis, with the third sheaves individually directing the multiple first dough strips; a series of fourth sheaves each individually rotatable about a fourth axis, with the fourth sheaves individually directing the multiple second dough strips, with the series of third and fourth sheaves being in a V-configuration; a series of fifth sheaves each individually rotatable about a fifth axis, with the fifth sheaves individually directing the multiple first dough strips; and a series of sixth sheaves each individually rotatable about a sixth axis, with the sixth sheaves individually directing the multiple second dough strips, with the fifth and sixth axes being parallel to each other and to the first and second axes but perpendicular to the third and fourth axes, with the series of fifth and sixth sheaves being in a V-configuration.

29. The apparatus of claim 18 further comprising, in combination: stationary guides on opposite axial sides of each of the cutting discs for guiding the dough strips to the nip of the rollers.

30. The apparatus of claim 29 wherein the stationary guides extend downstream of the nip of the counterrotating rollers and include passages for directing flowing air into the cavities downstream of the nip of the counterrotating rollers.

31. The apparatus of claim 18 further comprising, in combination: means for slitting a dough sheet having first and second faces into multiple pairs of first and second dough strips.

32. The apparatus of claim 31 further comprising, in combination: a sheet forming device for forming dough into the dough sheet having a first face including a three dimensional configuration.

33. The apparatus of claim 18 further comprising, in combination: a transition in an operationally downstream sealed arrangement with the rotary cutter for drawing the individual food products from the cavities by a vacuum.

34. The apparatus of claim 18 further comprising, in combination: air passages for directing flowing air into the cavities downstream of the nip of the counterrotating rollers.

35. The application of claim 18 wherein the portion of the dough strips passing through the nip are under tension.

* * * * *